W. S. WILSON.
Galvanic-Batteries.
No. 216,774. Patented June 24, 1879.
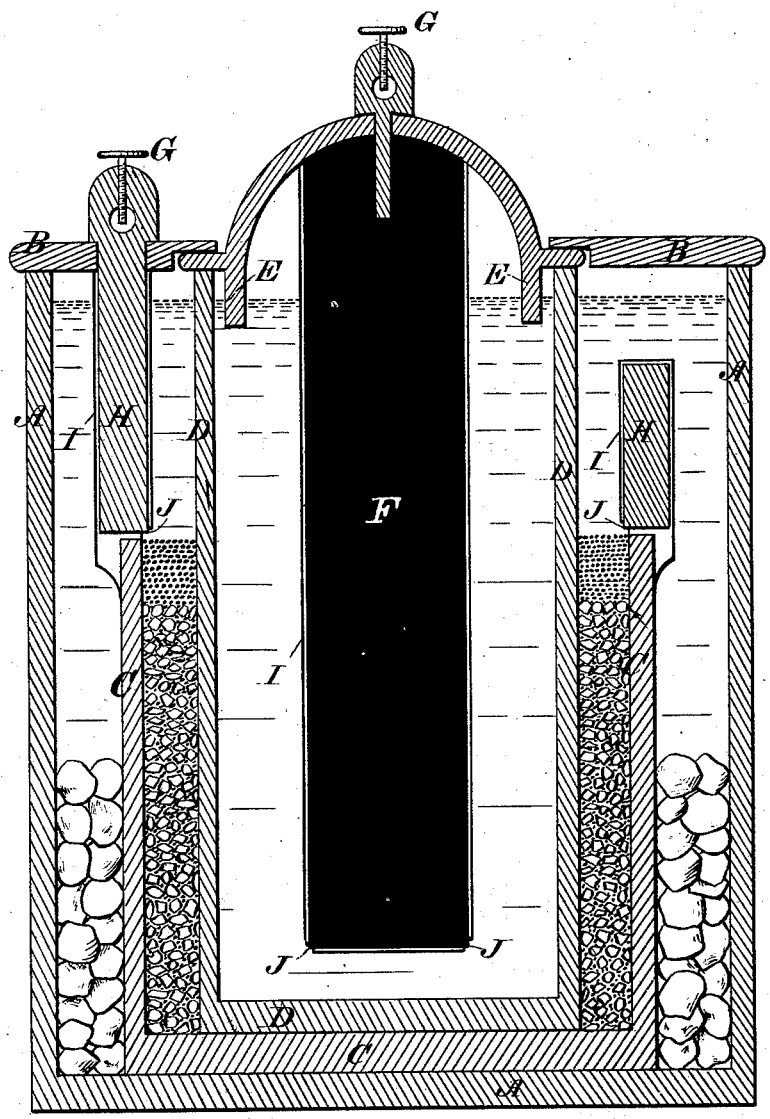
Witnesses:
Orrin P. Twitchell.
William W. Dodge.
Inventor:
W. S. Wilson
By his Atty
Dodge & Son

UNITED STATES PATENT OFFICE.

WILLIAM S. WILSON, OF SUNDERLAND, ENGLAND.

IMPROVEMENT IN GALVANIC BATTERIES.

Specification forming part of Letters Patent No. 216,774, dated June 24, 1879; application filed August 17, 1878.

*To all whom it may concern:*

Be it known that I, WILLIAM SPARKES WILSON, of Sunderland, England, electrician, have invented new and useful Improvements in Galvanic Cells or Batteries, of which the following is a specification, reference being had to the accompanying drawing.

This invention has for its object the construction of a cell or battery at the same time cheap, constant, powerful, and practically free from danger and deleterious fumes, and the partial application of the same to any other cells or batteries.

All forms of galvanic cells or batteries as at present constructed are formed on the plan of having large surfaces of the positive and negative elements—a plan which results in great waste of the exciting chemicals and liquids, thereby considerably lowering the electro-motive force and hindering the constancy and workable duration of the cell or battery. I find, however, that electrical excitation takes place better between lines or points than between surfaces; consequently I partially cover the surfaces of the elements with some isolating and anti-corrosive material, usually solid paraffine. (Shown in drawing, at I.) Thus the lines, points, or edges only of the positive and negative elements are exposed to chemical action.

The invention is, however, best described by reference to the accompanying drawing of a cell as actually constructed by me.

A is the containing-vessel with a wood or other cover, B. In this is another jar, C, made of some insulating material, called the "isolator," carrying on its rim or projection the zinc or any other positive element, H, fitted with a binding-screw, G, and covered with paraffine, except at its inner edges, as shown. Within the isolator I place a porous cell or diaphragm, D, having a porous cover, preferably bell-shaped, resting on it and dipping down into it, called the "condenser" E. Hanging down from the center of this is the carbon or any other negative element, F, fitted with the binding-screw, G. This carbon is also covered with paraffine, exept its lower edges, as shown.

Surrounding the carbon and reaching above the bottom of the condenser within the diaphragm, I place a solution composed of one volume commercial sulphuric acid and one volume saturated solution of nitrate of soda. Between the diaphragm and the isolator I place a mixture of two parts, by weight, of binoxide of manganese, two of sand, and one of nitrate of soda, with a coating of sand on the top half an inch deep, which last acts as an extension and virtual part of the diaphragm D. The binoxide of manganese and nitrate of soda could be replaced by certain other substances rich in oxygen; but I prefer the mixture described, as the cheapest and least troublesome oxygenating material I know of for the purpose.

In the containing-vessel I place lumps of chalk to about one-third of its height and fill up with sufficient saturated solution of sulphate of soda to cover the zinc and be level with the liquid within the diaphragm.

The advantages of the oxygenating materials, viz., nitrate of soda and binoxide of manganese, are as follows:

First, nitrate of soda furnishes oxygen to burn off the hydrogen that is liberated at the zinc, thus preventing polarization.

Second, binoxide of manganese supplies oxygen to the nascent nitrate of soda, and thus hinders any fumes of nitrous acid being given off outside of the diaphragm.

Third, saturated solution of nitrate of soda for the formation of nitric acid in the diaphragm is employed on account of its being of equal density with sulphate of soda outside of the diaphragm, thus preventing the gravitation of either of them into their wrong compartments. If they were allowed to mix it would prevent the proper working of the cell.

Fourth, hydrogen that is formed so rapidly combines with the oxygen of the nitrate of soda that it prevents any secondary currents from forming, thus giving the cell higher electro-motive force and lower internal resistance than in any other known battery. It being of such high tension, chalk is used to take up any free sulphuric acid that may come over from the diaphragm, and thus afford additional protection to the zinc.

The condenser is specially made porous, so as to allow the nitrous fumes to take oxygen from the outside air and form nitric acid; hence an ordinary lid to retain the fumes would not answer the purpose. A flat lid would not answer so well, because the reformed nitric acid would not readily descend into the diaphragm. The nitrous fumes disengaged at the carbon would fly into the air but for the condenser. If it were an impervious cover they would be but slowly absorbed of air, or not at all; but being a porous cover, air gets in and combines with the nitrous anhydræ, forming by its oxygen nitric anhydride, which is rapidly reabsorbed, and also takes up oxygen liberated at the diaphragm, as well as that obtained through the porous cover.

The following formulæ show the chemical arrangement and the chemical action:

CHEMICAL ARRANGEMENT BEFORE ACTION.

| Carbon side of Diaphragm. | Zinc side of Diaphragm. |
|---|---|
| Carbon....................C | Zinc........................Zn |
| Sodic nitrate.........$NaO\ NO_5$ | Water.....................$H_2O$ |
| Sulphuric acid..........$H_2\ SO_4$ | Sodic sulphate..........$NaSO_4$ |
| Binoxide of manganese..$MnO_2$ | Carbonate of lime....$CaO,\ CO_2$ |

DURING ACTION.

| Carbon side. | Zinc side. |
|---|---|
| $NaO\ NO_5 + H_2O\ SO_4 +$ | $NaSO_4 + H_2O + Zn +$ |
| $MnO_2 + H_2O + C$ | $CaO, CO_2$ |
| $NaO, NO_4$ ...............O | $H_2O$ |
| SO$_4$ | $H_2$.......................ZnO |
| $H_2$ | Na......................$ZnSO_4$ |
| $NaO\ NO_4$ | O........................MnO |

I claim as my invention—

1. The combination, in galvanic cells or batteries, of an isolator, C, with the porous diaphragm or cell, D, for the purpose of more effectually preventing the heavier liquid from gravitating into the lighter.

2. The oxygenating materials, with or without sand, as specified, between the porous diaphragm and the isolator.

3. In combination with a galvanic cell or battery, a porous cap or condenser, E, to retain the nitrous fumes, in order that they may combine with oxygen and reproduce nitric acid within the cell.

4. The combination in galvanic cells, of the three compartments A, containing the positive element and water or saline solution—C containing the oxygenating substance, and D containing the negative element and its exciting acid.

WILLIAM SPARKES WILSON.

Witnesses:
JOSHUA STANSFIELD WILSON,
JOHN BURTT SPARKES.